(12) United States Patent
Badi et al.

(10) Patent No.: US 8,699,953 B2
(45) Date of Patent: Apr. 15, 2014

(54) LOW-LATENCY INTERFACE-BASED NETWORKING

(75) Inventors: Eric Louis Pierre Badi, Cagnes sur Mer (FR); Yves Michel Marie Massé, Biot (FR); Philippe Francois Georges Gentric, Valbonne (FR)

(73) Assignee: Texas Instruments Incorporated, Dallas, TX (US)

( * ) Notice: Subject to any disclaimer, the term of this patent is extended or adjusted under 35 U.S.C. 154(b) by 167 days.

(21) Appl. No.: 13/444,781

(22) Filed: Apr. 11, 2012

(65) Prior Publication Data

US 2013/0252543 A1 Sep. 26, 2013

(51) Int. Cl.
*H04B 5/00* (2006.01)
(52) U.S. Cl.
USPC .......................... 455/41.2; 370/401; 370/419
(58) Field of Classification Search
USPC ............ 455/41.1, 41.2, 422.1, 423, 516, 517, 455/67.11; 370/400, 401, 402, 419, 420, 370/421
See application file for complete search history.

(56) References Cited

U.S. PATENT DOCUMENTS

| | | | |
|---|---|---|---|
| 2007/0110088 A1* | 5/2007 | Kemp et al. | 370/419 |
| 2010/0227553 A1* | 9/2010 | Charrat et al. | 455/41.1 |
| 2011/0134931 A1* | 6/2011 | Merwe et al. | 370/401 |
| 2013/0109314 A1* | 5/2013 | Kneckt et al. | 455/41.2 |

* cited by examiner

*Primary Examiner* — Thanh Le
(74) *Attorney, Agent, or Firm* — Ronald O. Neerings; Wade James Brady; Frederick J. Telecky, Jr.

(57) ABSTRACT

A network of processing devices includes a medium for low-latency interfaces for providing point-to-point connections between each of the processing devices. A switch within each processing device is arranged to facilitate communications in any combination between the processing resources and the local point-to-point interfaces within each processing device. A networking layer is provided above the low-latency interface stack, which facilitates re-use of software and exploits existing protocols for providing the point-to-point connections. Higher speeds are achieved for switching between the relatively low numbers of processor resources within each processing device, while low-latency point-to-point communications are achieved using the low-latency interfaces for accessing processor resources that are external to a processing device.

20 Claims, 6 Drawing Sheets

LOW-LATENCY INTERFACE-BASED NETWORKING

CLAIM OF PRIORITY

This application for patent claims priority to French Application No. 12290099.6 entitled "LOW-LATENCY INTERFACE-BASED NETWORKING" filed Mar. 21, 2012 in the French Patent Office, wherein the application listed above is incorporated by reference herein.

BACKGROUND

Electronic systems are being designed to solve ever-increasingly difficult tasks such as multiple-camera image processing and/or real-time object ranging and/or object recognition. Such processing often requires multiple processors and hardware accelerators that synchronously operate using high-bandwidth/low-latency interfaces. With such electronic systems being increasingly integrated with various kinds of specialized hardware and software, it is becoming more difficult to provide a common interface that efficiently and timely shares information between the processing resources within the processing system.

SUMMARY

The problems noted above are solved in large part by a network of processing devices that includes a medium for low-latency interfaces for providing point-to-point connections between each of the processing devices. A switch within each processing device is arranged to facilitate communications in any combination between the processing resources and the local point-to-point interfaces within each processing device. A networking layer is provided above the low-latency interface stack, which facilitates re-use of software and exploits existing protocols for providing the point-to-point connections. Higher speeds are achieved for switching between the relatively low numbers of processor resources within each processing device; while low-latency point-to-point communications are achieved using the low-latency interfaces for accessing processor resources that are external to a processing device.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description—and claims—to refer to particular system components. As one skilled in the art will appreciate, various names may be used to refer to a component. Accordingly, distinctions are not necessarily made herein between components that differ in name but not function. In the following discussion and in the claims, the terms "including" and "comprising" are used in an open-ended fashion, and thus are to be interpreted to mean "including, but not limited to . . . ." Also, the terms "coupled to" or "couples with" (and the like) are intended to describe either an indirect or direct electrical connection. Thus, if a first device couples to a second device, that connection can be made through a direct electrical connection, or through an indirect electrical connection via other devices and connections.

Figure 1:
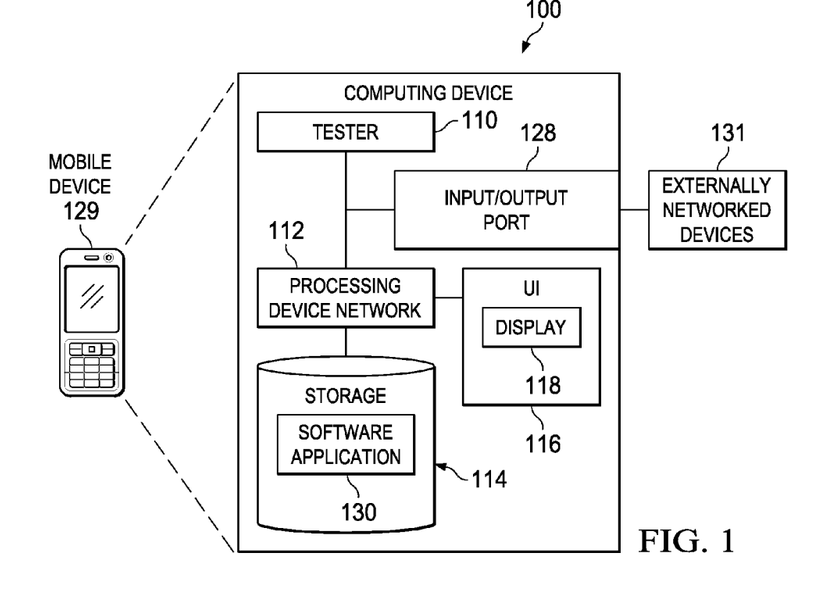
FIG. 1 shows an illustrative computing device in accordance with embodiments of the disclosure.

FIG. 1 shows an illustrative computing device 100 in accordance with embodiments of the disclosure. For example, the computing device 100 is, or is incorporated into, a mobile device 129, such as a mobile phone, a personal digital assistant (e.g., a BLACKBERRY® device), a personal computer, automotive electronics, robotics equipment, or any other type of electronic system.

In some embodiments, the computing device 100 comprises a megacell or a system-on-chip (SoC) which includes control logic such as a processing device network 112, a storage 114 (e.g., random access memory (RAM)) and tester 110. The processing device network 112 includes processors such as CPUs (Central Processing Units) that can be, for example, a CISC-type (Complex Instruction Set Computer) CPU, RISC-type CPU (Reduced Instruction Set Computer), or a digital signal processor (DSP). The processors can also be, for example, accelerated hardware processors that are arranged to perform specific tasks with relatively limited programmability. The storage 114 (which can be memory such as RAM, flash memory, or disk storage) stores one or more software applications 130 (e.g., embedded applications, operating system, drivers, and the like) that, when executed by the processing device network 112, perform any suitable function associated with the computing device 100.

The tester 110 is a diagnostic system and includes logic (embodied at least partially in hardware) that supports monitoring, testing, and debugging of the computing device 100 executing the software application 130. For example, the tester 110 can be used to emulate one or more defective or unavailable components of the computing device 100 to allow verification of how the component(s), were it (they) actually present on the computing device 100, would perform in various situations (e.g., how the component(s) would interact with the software application 130). In this way, the software application 130 can be debugged in an environment that resembles post-production operation.

The processing device network 112 comprises memory and logic that store information frequently accessed from the storage 114. The computing device 100 is often controlled by a user using a UI (user interface) 116, which provides output to and receives input from the user during the execution the software application 130. The output is provided using the display 118, indicator lights, a speaker, vibrations, and the like. The input is received using video and/or audio inputs (using, for example, voice recognition), and mechanical devices such as keypads, switches, proximity detectors, and the like. The processing device network 112 and tester 110 are coupled to I/O (Input-Output) port 128, which provides an interface (that is configured to receive input from (and/or provide output to) peripherals and/or networked devices 131, including tangible media (such as flash memory) and/or cabled or wireless media (such as a Joint Test Action Group (JTAG) interface). These and other input and output devices are selectively coupled to the computing device 100 by external devices using wireless or cabled connections.

The processing device network 112 is a network of processing devices that are networked together using low-latency interfaces for providing point-to-point connections across a medium arranged between each of the processing devices. A switch within each processing device is arranged to facilitate communications in any combination between local processing resources (within a processing device) and remote processing resources (remote to the local processing device) using a local stack of one of a number of point-to-point interfaces associated with each processing device.

Figure 2:
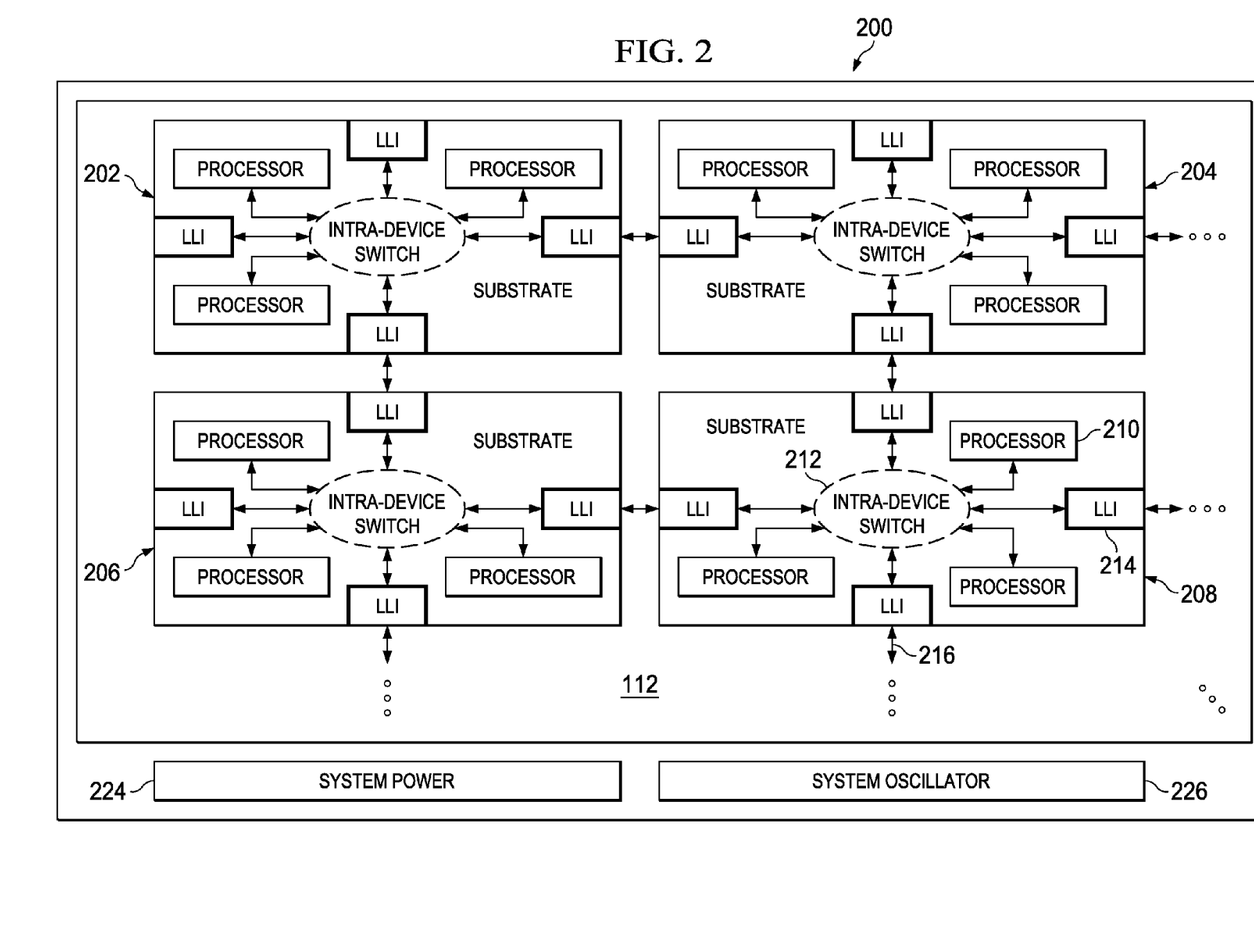
FIG. 2 is a block diagram illustrating a computing system that includes a processing device network in accordance with embodiments of the disclosure.

FIG. 2 is a block diagram illustrating a computing system 200 that includes a processing device network 112 in accordance with embodiments of the disclosure. Computing system 200 is illustrated as including a processing device network 112, and, for example, system power 224 and system oscillator 226. A processing device 202 is formed and arranged using a substrate (202) such as a chip, die, stacked die, printed circuit board, and the like. The processing device 202 includes one or more processors 210, an intra-device switch 212, and one, two, three, or more low-latency interfaces 214. Likewise, processing device 204 is formed and arranged using a substrate (204), processing device 206 is formed and arranged using a substrate (206), and processing device 208 is formed and arranged using a substrate (208).

Intra-device switch 212 is provided to switch communications within each processing device in any combination between the processors 210 and the low-latency interfaces 214 that are arranged within each processing device. Thus processors 210 can communicate directly through the intra-device switch 212 with processors 210 (within the same processing device), processors 210 can communicate directly through the intra-device switch 212 with low-latency interfaces 214, low-latency interfaces 214 can communicate directly through the intra-device switch 212 with processors 210, and low-latency interfaces 214 can communicate directly through the intra-device switch 212 with other low-latency interfaces 214. The low-latency interface 214 is an inter-device interface that is arranged to form half of a point-to-point connection with another processing device.

In operation, a processor 210 (for example) of a processing device initiates communications. A first communication is typically a request communication that requests resources (such as processing or memory) of a target processor. Each communication normally includes an identifier for identifying (and/or addressing) a resource being requested of a target processor; each communication also typically includes a processor identifier for identifying the initiating processor (so that the target processor can respond to the actual processor that initiated the communication).

When the communication is between processors 210 of the same processing device, intra-device switch 212 forwards (or otherwise couples or "hands-off") the communication to the target processor using the target processor identifier of the communication. The communication is routed "directly" (e.g., without using a low-latency interface) to the target processor. The target processor identifier can be, for example, an address of the target processor, a unique token that is associated before-hand with the target processor, or an address of a processing resource of the target processor. Intra-device switch 212 uses signaling and/or memory mapping to select the appropriate switch setting to couple the communication to the target processor that is identified by the target processor identifier as being within the same processing device in which the intra-device switch 212 is arranged.

When the communication is not between processors 210 of the same processing device (e.g., when the initiating processor is of a different processing device than the processing device in which the target processor is arranged), intra-device switch 212 uses the target processor identifier of the communication to determine which low-latency interface to use to forward (or otherwise couple) the communication to the target processor.

For example, when the initiating processor 210 is in the processing device 202 and when the target processor 210 is in the processing device 208, the communication can be routed (and/or signaled) to the target processor via a point-to-point connection with either a low-latency interface of processing device 204 or 206 (which are interposed between processing devices 202 and 208). In such a situation, intra-device switch 212 of processing 202 uses the target processor identifier of the communication to retrieve routing information to determine which low-latency interface (of processing device 204 or 206) to use to forward (or otherwise couple) the communication to the target processor.

Thus (in the example), a communication from an initiating processor 210 of processing device 202 is routed by intra-device switch 212 of processing device 202 to a low-latency interface of processing device 202 that is coupled to a low-latency interface 214 of processing device 204 or 206. The communication is subsequently routed from the coupled-to low-latency interface 214 of processing device 204 or 206 via the intra-device switch 212 of processing device of the selected processing device (204 or 206) to a low-latency interface 214 of the selected processing device (204 of 206) that is coupled to a low-latency interface 214 of processing device 208. Finally the communication is routed from the coupled-to low-latency interface 214 of processing device 208 via the intra-device switch 212 of processing device 208 to the target processor 210 of processing device 208.

The target processor 210 uses the target processor identifier of the request communication (and/or an address and other information associated with the request communication) to identify a requested resource of the target processor 210. The identified resource of the target processor 210 is used to generate a response to the request communication. The generated response (or a portion thereof) is included in a response communication that is to be sent from the target processor to the initiating processor. The initiator processor identifier is used to "backwards route" the response communication in, for example, the reverse order in which the request communication was routed.

When the response communication is directed toward a processor 210 of the same processing device (e.g., "on-chip"), intra-device switch 212 of the processing device forwards the response communication "directly" (e.g., without using a low-latency interface) to the target processor using the initiator processor identifier of the request communication. When the communication is not between processors 210 of the same processing device (e.g., "off-chip"), intra-device switch 212 uses the initiator processor identifier to determine which low-latency interface to use to forward (or otherwise couple) the communication to the target processor.

For example, when a request communication is initiated by processing device 202 for processing resources of processing device 208, the response communication generated by the target processing device 208 traverses from processing device 208 via processing device 206 or 204 to processing device 202. While the return path for the response communication is typically the reverse path of the original request path of the request communication, the actual routing is determined by the routing information stored in (or accessed by) intra-device switches of each processing device (which is discussed further below with respect to FIG. 4).

Because the communications proceed across the same substrate and the number of potential switching combinations is relatively small, the communications can proceed at a higher speed (e.g., as an intra-processing device communication) as compared with communications that cross a processing device boundary (e.g., as an inter-processing device communication).

Processing device boundaries are typically delineated by the boundary (such as the perimeter of a chip) of the substrate upon which the processors of the processing device is formed. However, processing device boundaries can exist between processing devices that are arranged in different portions of a common substrate. One embodiment includes designs having locations of high speed intra-processing (e.g., collocated due to minimizing propagation delays due to length of transmission lines) and relatively slower communications between (logically) separate processing devices located (incidentally or otherwise) on the same substrate. (As discussed below, a programmer's model uses different layers in a protocol stack to perform intra-processing device switching as compared with the typically less-complex inter-processing device switching.) Another embodiment includes processing devices boundaries delineated by boundaries formed by the extent of the layout of so-called "intellectual property" provided by different vendors and/or designers where different processing devices have been selected for performing different processing tasks.

More (or less) processing devices than those shown in FIG. 2 may be present in various embodiments in accordance with a selected network topology. Processing device network 112 is arranged in a mesh topology (partially shown for simplicity in FIG. 2). Network topologies in various embodiments include: line, ring, star, mesh, fully-connected, tree, bus, and the like. The number of low-latency switches on each networked processing device is selected in accordance with the networked topology. In the example mesh topology, each processing device includes four low-latency switches 214, each of which is logically and/or physically located to provide one-half of a layered protocol connection used to establish a point-to-point connection with each of the four (logically and/or physically) adjoining processing devices. (In an embodiment, each of the first processing devices in a row and/or column of processing devices are linked to the last processing device in a row or column such that a ring is formed in row or ring so-linked.)

Medium 216 is provided to physically link each (corresponding) pair of low-latency interfaces 214 to establish a point-to-point connection. Thus, medium 216 is logically linked to the physical layer (L1) of each protocol stack of the processing device to which the respective low-latency interface 214 is linked.

Figure 3:
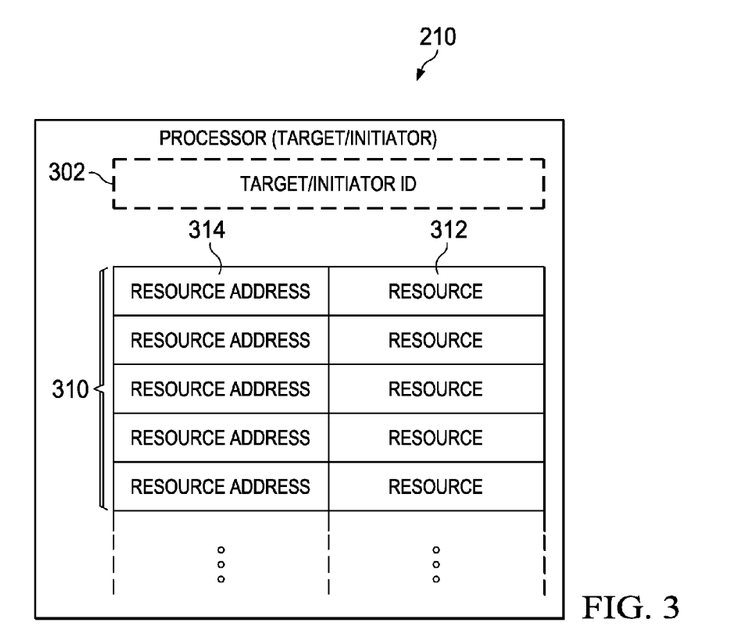
FIG. 3 is a block diagram of a processor of a processing device in accordance with embodiments of the disclosure.

System power 224 is used to power each of the processing devices of the processing device network 112 as well as other devices such as the system oscillator 226, which provides system synchronization and clocking FIG. 3 is a block diagram of a processor of a processing device in accordance with embodiments of the disclosure. Processor 210 is associated with a target and/or initiator processor identifier (Target/Initiator ID) 302 that is used by the processor 210 as a return address for response communications or that is used by other processors as an address for requesting processing resources of processor 210.

Process 210 includes processing resources 310 that are used to facilitate execution of tasks by the processor 210. Resource 312 can be a register, sub-processor, hardware accelerator, state logic, or any type of resource that is useful for accomplishing tasks of the processor 210. Thus, resource 312 can be a shared volatile or non-volatile memory where a constant or a parameter useful for processing tasks that is to be stored and shared on the processing device network.

Each of the resources 312 is associated with a resource address 314. Thus, the resources are addressable, and can be requested using the resource address 314 by processors 210 of the same processing device as well as by processors 210 of the other processing devices. As discussed below with respect to FIG. 4, the resource addresses of each (or a portion of each) processor is associated with an address range that includes the resource addresses. The address ranges are used to identify the processor (or portion of a process) that is associated with a request for a particular resource. Thus, routing information (e.g., to select a processing device) and the processor that includes a requested resource is more easily (e.g., more compactly) stored and accessed in each of the processing devices.

In an embodiment, a common addressing range is used for addressing all resources for each processing device (e.g., 202) of the processing network 112. Each processing device is associated with a unique sub-range of addresses from the common addressing range. Request communications are arranged to address resources of the target processor using an address (or identifier associated with the address) carried by the request transaction (as described below). Response communications are arranged to address the initiating processor by an identifier that is carried by the response transaction.

In another embodiment, a pool of signals is used for selecting each resource for any processing device (e.g., 202) of the processing network 112. Each processing device is associated with a unique sub-pool of signals selected from the pool of signals. Communications are arranged to select resources of the target processor by routing (e.g., selectively propagating) the signals across selected pairs of selected low-latency interfaces (LLIs). The signal number (e.g., the particular signal used) is used to distinguish between the a signal that is to be re-routed to another LLI pair as compared with a signal that (for example) selects a resource of a processing device 112 to which the signal has been routed.

Figure 4:
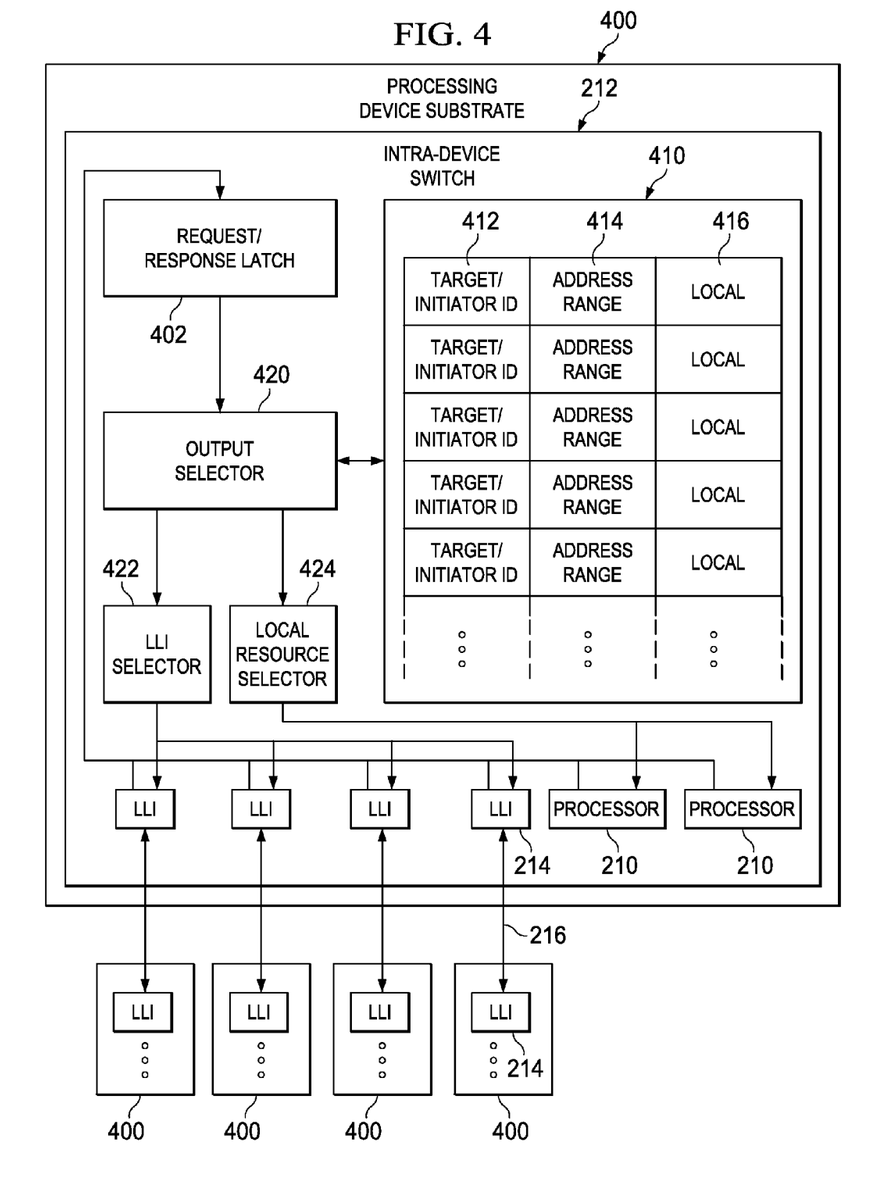
FIG. 4 is a block diagram illustrating a processing device in accordance with embodiments of the disclosure.

FIG. 4 is a block diagram illustrating a processing device 400 in accordance with embodiments of the disclosure. Processing device substrate 400 is illustrated as including processors 210, and four low-latency interfaces 214. Each of the four low-latency interfaces 214 is coupled via a medium 216 to a corresponding low-latency interface 214 that is arranged on a processing device substrate 400. (The substrate 400 associated with each low-latency interface 214 may be physically the same, but as discussed above, may have differing electrical or logical characteristics that define the effective boundary of a substrate.) For simplicity, not all of the connection of each of the corresponding low-latency interfaces 214 is shown.

Intra-device switch 212 includes a request/response latch 402, memory map 410, output selector 420 and LLI (low-latency interface) selector 422, and local resource selector 424. The request/response latch 402 is arranged to receive a communication such as a request communication or a response communication from a processor 210 or a low-latency interface 214. The received communication includes an identifier for identifying a processor (or a processor resource) to which to send the communication.

The request/response latch 402 is arranged to signal the output selector 420 in response to the received identifier. The identifier may be an address of a processor resource and/or an identifier of an initiating or target processor itself. The output selector 420 is arranged to query the memory map 410 for information used to switch or route the communication. The received identifier is used to index, for example, the target/initiator ID (identifier) 412 field or the address range 414 field to select an associated route 416 field. Information such as route 416 information provides appropriate information for switching or routing the communication to a next destination. Route 416 information is, for example, information derived from a global routing map of the network of processing devices.

The output selector 422 is arranged to receive the routing information and determine from the received routing information whether an intra-processing device switching or an inter-processing device routing is needed. When the received routing information indicates that an intra-processing device switching is needed, the communication is forwarded to the local resource selector 424. The local resource selector selects the processor 210 (or resource of the processor 210) that is implicated by the switching information that is received in response to the received identifier of the communication. The communication is then forwarded to the implicated processor 210 (or resource of the processor 210) by the local resource selector 424.

When the received routing information indicates that an inter-processing device routing is needed, the communication is forwarded to the LLI (low-latency interface) selector 422. The local resource selector selects the particular low-latency interface 214 that is implicated by the routing information that is received in response to the received identifier of the communication. The communication is then forwarded to the implicated low-latency interface 214 by the LLI selector 422.

Figure 5A:
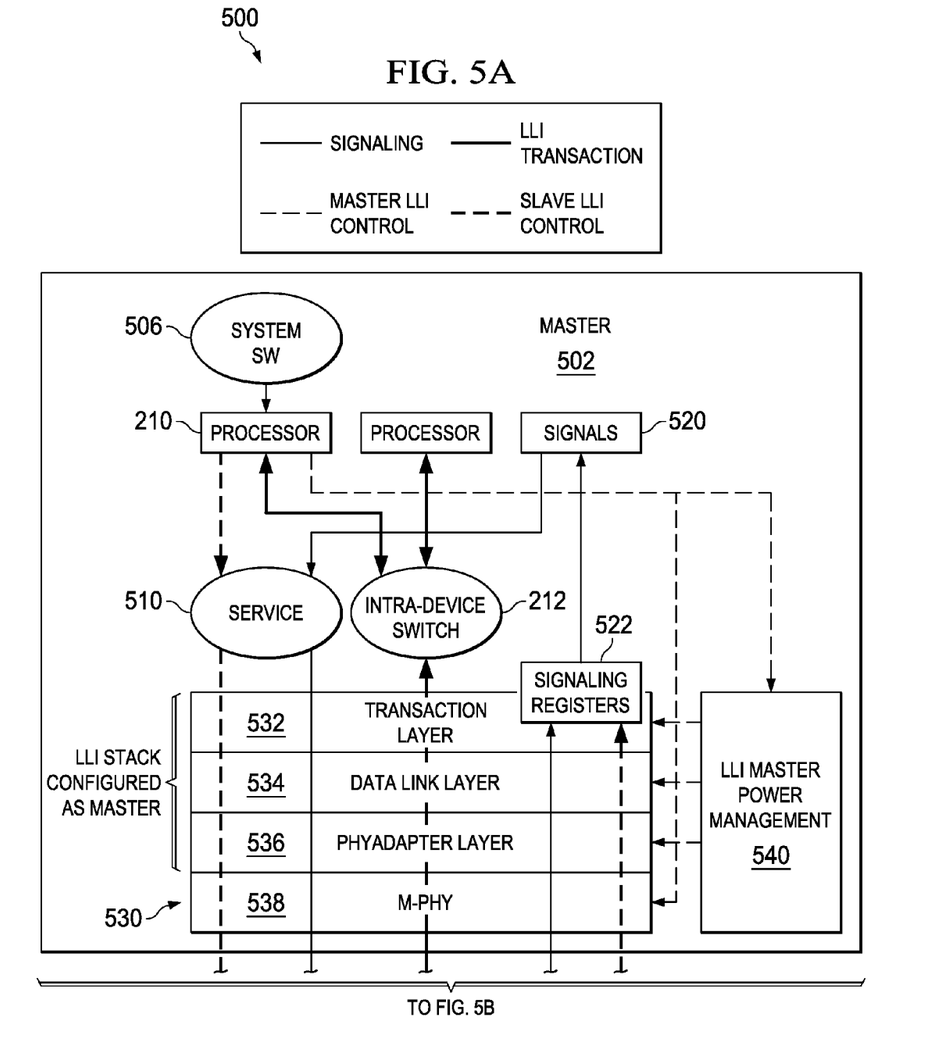
FIG. 5 is a schematic diagram illustrating a low-latency interface point-to-point connection in accordance with embodiments of the disclosure.
Figure 5B:
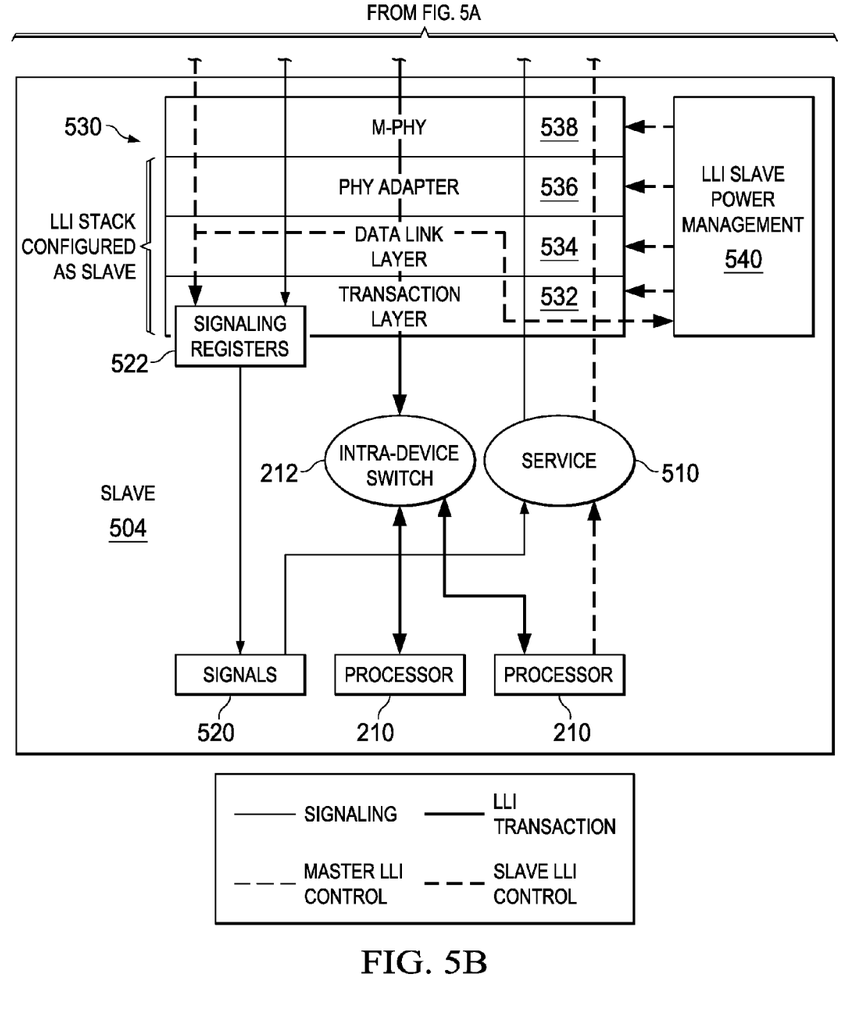

FIG. 5 is a schematic diagram illustrating a low-latency interface point-to-point connection in accordance with embodiments of the disclosure. A typical LLI environment is illustrated in FIG. 5 and is used to describe an example mode of operation of the LLI 530. Thus all possible LLI 530 implementations and capabilities are not necessarily represented.

Low Latency Interface (LLI) 530 is a point-to-point interconnect that allows two different processing devices (on separate chips, for example) to communicate as if a device attached to the remote chip is resident on the local chip. The connection between devices is established at their respective interconnect level using memory mapped transactions, for example. An LLI link is a bidirectional interface that permits either device to initiate transactions across the LLI link.

LLI 530 operates using low-latency cache refill transactions. The low latency use cases are supported by the dedicated Low Latency traffic class (LL TC). The LLI 530 uses a layered, transaction-level protocol, where target processing devices and initiating processing devices that on two separate, but linked, chips exchange transactions without software intervention. Software is normally used relatively occasionally to configure the LLI 530 link, for error handling, and to initialize the LLI Stack 528. The LLI 530 configuration reduces latency and allows software compatibility regardless of the partitioning of the hardware on the two linked chips.

In order to increase the bandwidth utilization of LLI 530, a best-effort traffic class is used that allows access to memory-mapped remote devices without decreasing the performance of any low-latency traffic. Also, the LLI 530 provides a special set of transactions for transmitting sideband signals between two chips connected with an LLI link. Semantics of the sideband signals are selected in accordance any suitable purpose. Using sideband signals thus allows the pin count on both chip packages to be reduced over the pin count required to achieve the same functionality without the use of sideband signals.

In the example system shown in FIG. 5, the system is formed in the substrates of two separate chips, wherein the substrates also are possibly arranged in two separate packages. On one substrate, a master 502 processing device is formed, and on the other substrate a Slave 502 processing device is formed. Processors on the substrate of the master 502 and processors on the substrate of the slave 504 are coupled to each other using an LLL link that is memory-mapped. The LLI link is memory mapped to facilitate device addressing.

The master 502 controls the slave 504, and manages the overall system memory map of other slave processing devices (if any) in the networked system. Thus, the master 502 is able to access processing resources on the slave 504 despite the fact the slave 504 is formed on a separate substrate. Processors (which have processing resources such hardware accelerators and/or programmable processors) 210 appear as being an accessible processor to both the master 502 intra-device switch 212 and the slave 504 intra-device switch 212. Thus, system design is simplified because control of the remote processors is similar to control of local processors that are coupled to the local interconnect and because control of diverse kinds of processors (such as programmable CPU cores as compared with hardware accelerators) is unified under the same control system as disclosed herein.

The configuration, boot interface, and management of the physical medium (M-PHY) layer are typically part of the (e.g., operating) system software (e.g., as "drivers"). The system software 506 executing on the master 502 is used to control the LLI master power management 540 and, by using service transactions (generated by service unit 510), and to control the LLI slave power management 550 (on the slave 504). Service transactions are also used to transfer signal values (generated by signal unit 520) between the master 502 and the slave 504. The signal values are transferred through an LLL link, which is used to control the physical medium layer (M-PHY) 538 and the LLI stack 528 in each LLI 530, the signaling being routed through the LLI 530 and transactions being exchanged by the LLI 530.

In an embodiment, the network exposes to the operating system a standard interface, such as an LLI interconnect driver. The LLI interconnect driver is arranged to emulate a giga-bit Ethernet network. The emulation driver facilitates integrating various applications such as (a) distributed (web) servers architecture (b) distributed data processing (e.g., in general either load balancing or task diversity repartition). In the architecture, each processing device (or chip) is typically assigned a different (local) IP (internet protocol) address, and thus emulates as an IP node, including with routing capabilities. The emulation facilitates virtually a complete reuse of existing server programs and software utilities. In another embodiment, a multi-core IPC (Inter Processor Communication) scheme is used to emulate a network of processing devices.

A power management interface (such as LLI master power management 540 and LLI slave power management 550) is defined for use by the system to control the LLI stack 528 via data link layer 534. A role of power management is to boot the LLI stack 528 and to manage the power consumed by the LLI stack 528 by configuring the power state of the M-PHY 538 layer. The power management interface is arranged in accordance with the definition of LLI states, attributes for control and status, a state machine that manages transitions between states, and provides control for managing the various sequences that allow the system to control the LLI stack 528 and insure the interoperability of an LLI link 528.

Figure 6:
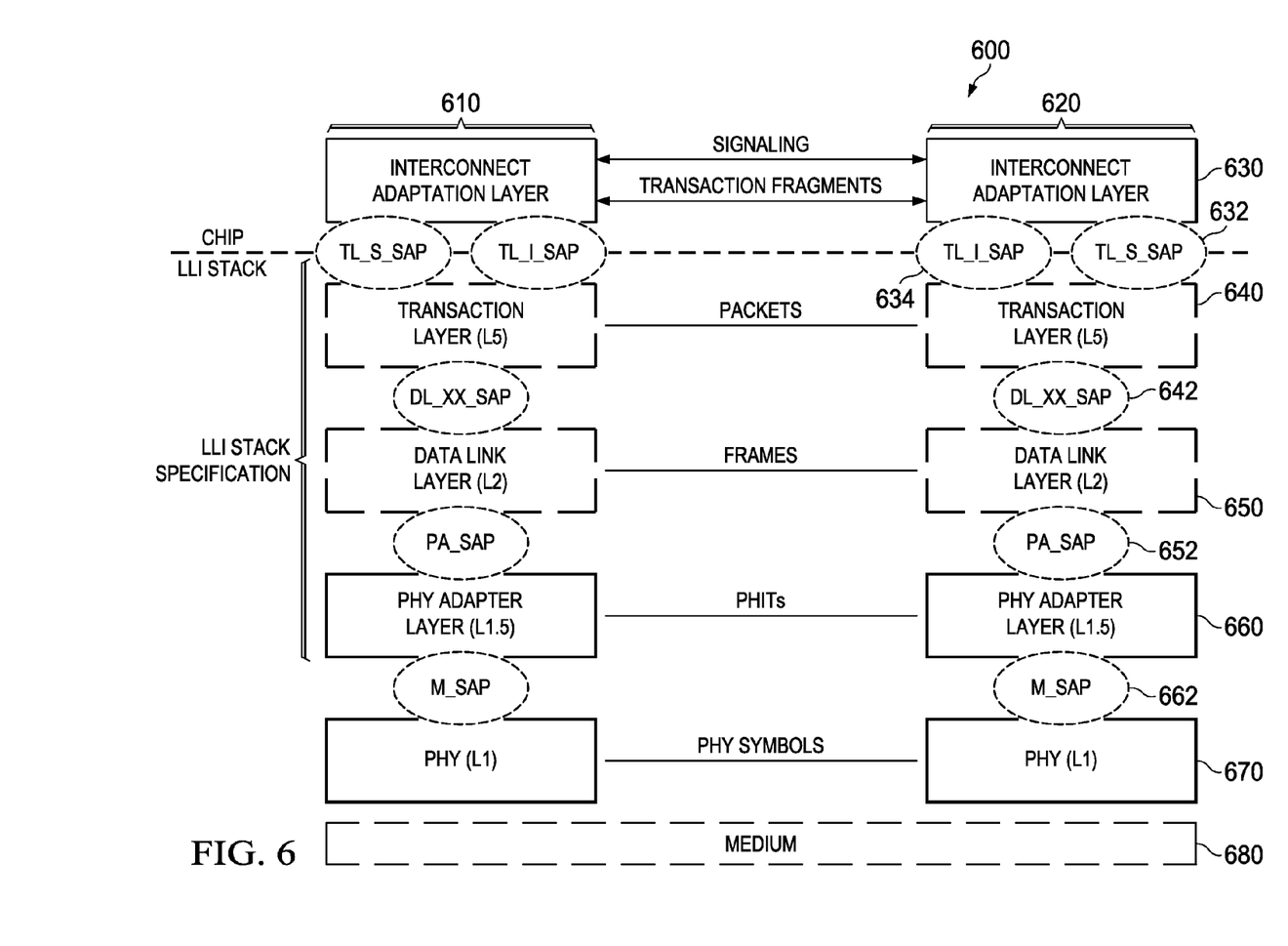
FIG. 6 is a block diagram illustrating an LLI layering model in accordance with embodiments of the disclosure.

FIG. 6 is a block diagram illustrating an LLI layering model in accordance with embodiments of the disclosure. Model 600 is layered, transaction-level protocol, in which both target and initiating processors communicate using transaction fragments. Each layer in a protocol stack 610 has specific responsibilities and protocol data units (PDUs) that are used to communicate with a peer layer in a protocol stack 620 at the other end of an LLL link.

For example, at the top of each stack, the interconnect adaptation layer 630 on one end of the LLI link (e.g., in a protocol stack 610) communicates with the interconnect adaptation layer 630 on the other end (e.g., in a protocol stack 620) using PDUs called transaction fragments. Lower level layers respectively communicate using packets (transaction layer 640), frames (data link layer 650), PHITs (physical adapter level 660 interface transaction units) and, finally, at the lowest level (L1), symbols (physical layer 760). The layers in the LLI model are conceptual and are thus not necessarily intended to represent an actual implementation.

An LLI stack (e.g., the lower portion of stack 610) receives a transaction fragment from the local interconnect and in response converts the received transaction fragment to an appropriate PHIT for transmission by the physical layer (PHY) 670 to the remote chip. The PHY 670 converts the PHIT to PHY symbols and transmits the symbols to the linked-to LLI stack (e.g., the lower portion of stack 620) of the remote chip.

The linked-to LLI stack receives one or more PHITs from the remote chip, via the local PHY 670, and the receiving stack (e.g., stack 620) converts them into the original transaction fragment that is arranged to be executed by the target processor, which receives the reconstituted original transaction fragment via the local intra-device switch (which is also referred to as an "interconnect").

Transaction fragments are passed to and from the local interconnect using service access points (SAPs). A SAP provides service primitives to transfer transaction fragments to, or from, the LLI stack. Because transactions with a remote processing device can take longer to execute than transactions taking place within the same (local) processing device, a SAP also provides service primitives to communicate transaction status.

An LLI stack can also communicate with devices using signals. Signals (in an embodiment) are individual signal lines that are converted by the interconnect adaptation layer 630 to transaction fragments that are then passed to the remote LLI stack in the same manner as if the transaction fragments were received through a SAP. At the remote LLI stack, the transaction fragments are converted back to signals. (In another embodiment, signals are individually coupled across a low-latency interface.)

The configuration of the LLI link is accomplished using an interconnect block such as an intra-device switch. The LLI stack configuration is set up in a coordinated fashion using service access points (SAP) and service primitives. The structure of service access points and service primitives is specified using an OSI—(Open Systems Interconnection—) conforming naming convention as follows:

```
<name-of-service-access-point>  ::=   <layer-identifier>
{   _<traffic_class>}{   _<sap-
identifier> } _SAP | <layer-identifier>_ <sap-generic-identifier> _SAP
<layer-identifier> ::= TL | DL | PA
<sap-generic-identifier>::= I | S
<sap-identifier> ::= INITIATOR | TARGET
<traffic_class> ::= BE | LL | SVC | XX
BE: Best Effort LL: Low Latency SVC: Service XX: BE | LL | SVC
YY: generic Sap-identifier INITIATOR | TARGET
I: Interconnect generic identifier that is instantiated into
<traffic_class> _ <sap-identifier> with <traffic_class> ::= BE | LL
S: Service generic identifier that is instantiated into
<traffic_class> _ <sap-identifier> with <traffic_class> ::= SVC
```

Service primitive names are structured as follows:

```
<service-primitive> ::= <name-of-service-primitive> ( {<parameter>, }* )
<name-of-service-primitive>   ::=   <layer-identifier>  _
<service-primitive-name>  .
<primitive>
<parameter> ::= <Fragment-name> | <Packet-name> | <Frame-name>
<layer-identifier> ::= TL | DL | PA
<service-primitive-name> ::= <service-action>
<service-action> ::= FRAGMENT|PACKET|DATA
<primitive> ::= req | ind | rsp_L | cnf_L
```

TL: Transaction Layer
DL: Data Link Layer
PA: PHY Adapter Layer

Services are specified by describing the service primitives and parameters that characterize them. A service potentially can have one or more related primitives that constitute the activity that is related to that particular service. Each service primitive can have zero or more parameters that convey the information required to provide the service.

A primitive can be one of four generic types: a request type, an indication type, a local response type, and a local confirm type. A request-type primitive is passed from layer "x" to layer-"x–1" to request a service to be executed by layer "x–1." Typically, a request primitive is called from the interconnect adaptation layer 630. An indication-type primitive is passed from layer "x–1" to layer "x" to indicate an event that is significant to layer "x" and is logically related to a remote service request or event. A local response-type service primitive is passed from layer "x" to layer-"x–1" to complete a procedure previously invoked by an indication service primitive. The local response-type primitive is used to indicate the use of a layer-to-layer flow control for information passing in an "upwards" direction (e.g., by moving to higher layers) in the LLI stack. A local confirm-type service primitive is passed from layer "x–1" to layer "x" to complete a procedure previously invoked by a request service primitive. The local-confirm types is used to indicate the use of a layer-to-layer flow control for information passing downwards in the LLI stack.

The interconnect adaptation layer 630 is used to adapt the LLI transaction layer 640 to a transaction-based interconnect layer that manages communications inside a chip. An interconnect transaction typically includes one or more read or write request transfer cycles, optional write data transfer cycles, and zero or more response transfer cycles. From the interconnect adaptation layer 630 point of view, an LLI transaction includes an LLI request unit and an LLI response unit, each of which includes one or more LLI fragments.

Where the LLL link acts as a target of the interconnect (LLI target SAP) adaptation layer 630, the interconnect adaptation layer 630 is arranged to map interconnect requests and write data transfer cycles into LLI fragments in order to form one or more LLI request units. The interconnect adaptation layer 630 is also arranged to map the associated returned LLI fragments that forming the LLI response units into proper response transfer cycles that are in accordance with the interconnect protocol.

A single LLI transaction, (such as a single pair of LLI transaction request and response units), can be all that is needed for a given interconnect transaction, although in some cases several such pairs might be necessary. For example, when the interconnect transaction has a length greater than the maximum LLI transaction length, the interconnect transaction is split by the interconnect adaptation layer 630 into several LLI request units and associated response units. Each response unit, in turn, includes LLI fragments as payload. The interconnect adaptation layer is arranged to process and merge the LLI fragments of the LLI response units to create the appropriate interconnect adaptation layer 630 response transfer cycles using a single interconnect transaction.

After being transported through the local LLI stack (lower portion of stack 610), LLI transaction fragments (that form request units) reach the remote LLI stack (lower portion of stack 620) on an LLI initiator SAP. The LLI transaction fragments that reach the remote LLI stack are eventually converted by the remote interconnect adaptation layer 630 of stack 620 to interconnect request cycles and write data transfer cycles. Because the local interconnect protocol might differ from the remote interconnect protocol, the interconnect transfer cycles might also be formed differently with respect to the local and remote sides of the LLL link.

At an LLI initiator SAP, the interconnect adaptation layer 630 also maps interconnect response transfer cycles to LLI transaction fragments to be used to form the LLI response unit that corresponds to the associated LLI request unit. The LLI transaction fragments are transported back through the LLI stack of stack 610 to the target SAP that originated the LLI transaction, where the interconnect adaptation layer converts the LLI transaction fragments into the appropriate interconnect response transfer cycles.

A set of service (SVC) transactions are provided for modifying LLI configuration attributes, and to transport sideband signals. The interconnect adaptation layer 630 is responsible for converting interconnect transactions targeted to configure remote LLI stack configurations by modifying stack attributes modification transactions into the appropriate LLI SVC transactions. The interconnect adaptation layer 630 is also responsible for converting toggling of sideband signals into appropriate SVC transactions and converting response SVC transactions into toggling of sideband signals.

The interconnect adaptation layer 630 is also use to, for example, convert to and from interconnect protocols that have an address phase per request data phase, managing writes with (or without) early responses, handling read response interleaving, mapping user information, splitting long interconnect transactions into multiple LLI transactions (for burst size adaptation), and the like.

The transaction layer (L5) 640 is the uppermost layer of the LLI stack. The transaction layer (L5) 640 provides an interface between the LLI stack and the local chip. The transaction layer (L5) 640 interface is supported through two different types of SAPs: the transaction layer interconnect SAP (TL_I_SAP) 634 and the transaction layer service SAP (TL_S_SAP) 632. The transaction layer interconnect SAP 634 provides an interface for the local interconnect to communicate with the remote interconnect through the LLI link. The transaction layer 640 can have multiple interconnect SAPs 634, each of which represent different kinds of transaction flow traffic that have potentially differing characteristics, such as "low-latency" (LL) or "best-effort" (BE) delivery. For example, TL_I_SAP 634 can be used to represent four SAPs: the TL_LL_INITIATOR_SAP, the TL_LL_TARGET_SAP, the TL_BE_INITIATOR_SAP, and the TL_BE_TARGET_SAP.

A service (S) SAP provides an interface for the local chip to access remote LLI configuration attributes. Thus, TL_S_SAP 632 is a higher-level interface for the TL_S_VC_TARGET_SAP. The transaction layer typically instantiates the TL_SVC_TARGET_SAP in place of the TL_S_SAP 632.

From the viewpoint of the interconnect adaptation layer 630, the transaction layer 640 appears to execute transactions as it accepts memory-mapped access requests (from the local interconnect) and provides responses (to the local interconnect) using the service primitives of a TL_TARGET_SAP. Physically, the transaction layer 640 transmits ordered transaction fragments from the local interconnect or local hardware to a remote interconnect or remote hardware. Each transaction fragment is converted to a packet before it is sent to the data link layer 650 (discussed below). The transaction layer 640 is arranged to receive ordered packets that are sent from the remote interconnect adaptation layer 630, to convert them into transaction fragments, and to forward them (in the order received) to the local interconnect adaptation layer 630.

From the viewpoint of the interconnect adaptation layer 630, a TL_INITIATOR_SAP appears to generate memory-mapped access requests from the transaction layer 640. Physically, the transaction layer 640 transmits ordered transaction fragments from the remote interconnect or remote hardware to the local interconnect or local hardware.

The transaction layer 640 also executes service transactions. Service transactions are requests received from the remote LLI stack and initiated by the remote interconnect adaptation layer 630 using the service primitives of the TL_S_VC_TARGET_SAP that apply to a local LLI stack's configuration attribute space (which are not normally forwarded to the local interconnect or local hardware). An LLI stack typically transmits sideband signal information using write transactions in specific LLI configuration attribute space to emulate a transmission of a signal between two chips that are connected by an LLI link.

The transaction layer 640 is arrange to provide the following services to the interconnect adaptation layer: ordered, reliable and deadlock-free transmission of transaction fragments to the remote interconnect adaptation layer 630; ordered, reliable and deadlock-free reception of transaction fragments from the remote interconnect adaptation layer; reliable and deadlock-free delivery of service transactions to the remote transaction layer 640; and execution of service transactions received from the remote transaction layer 640.

The transaction layer 640 is arranged to receive the following services from the data link layer 650: ordered and reliable delivery of packets to the remote transaction layer 640; ordered and reliable reception of packets from remote transaction layer 640; separate flow control on a per-SAP basis to ensure deadlock-free transaction execution; and arbitration between packets sent to the remote transaction layer 640.

The data link layer (L2) 650 is arranged to provide flow control for the transaction layer 640. The data link layer (L2) 650 provides a data layer-transaction layer SAP interface (DL_XX_SAP 642) between the transaction layer 640 and the data link layer 650 itself. Flow control is provided by the DL_XX_SAP 642 because the transaction layer 640 is partially controlled by interconnect adaptation layer processes that are capable of applying "back-pressure" to transactions being generated by the transaction layer 640. Further, the flow control is independently configurable for each defined traffic class so that, for example, low-latency (LL) transactions may proceed while best-effort (BE) transactions may be blocked by their destinations. Thus, having several traffic classes allows for independent flow control.

In a like manner, a separate flow control is provided for the SVC traffic class, which enables service transactions to be processed by an LLI stack while the LL and BE channels are disabled (for example, just after reset or during power management transitions). Thus, the data link layer arbitrates frames received from the transaction layer in accordance with the configurations of the flow control attributes associated with each received frame. The data link layer 650 "assumes" that the PHY (physical) adapter layer 660 is reliable, which allows the transaction layer 640 and data link layer to use an unreliable SerDes (serializer/deserializer) PHY layers (physical layer L1) 670, or reliable PHY layers 670 such as DDR (double data rate DRAM) pads, and TSVs (through-silicon vias).

The physical adapter layer (L1.5) 660 is arranged to transmit and receive frames to and from the remote data link layer using physical layers 670. The physical adapter layer 660 implements error-correction/detection features and provides power management features to conserve the power otherwise consumed by PHY link. The physical adapter layer 660 provides a physical adapter (PA) layer SAP interface (PA_SAP 652) between the data link layer 650 and the physical adapter layer 660 itself. The physical adapter layer 660 provides the interface to enable the system software (e.g., system software 506) to communicate with the physical layer 670 that is coupled to the LLI stack (e.g., for interconnect purposes) and the procedure to update the configuration of the physical layers 670 (e.g., for signaling purposes).

The physical layer (L1) 670 is arranged to provide an interface from the PA Layer 670 to the physical medium 680. The physical layer 670 provides a (transmission) medium SAP interface (M_SAP 652) between the physical adapter layer 660 and the physical layer 670 itself. The low-latency interface (e.g., levels L5, L2, and L1.5 of a protocol stack) can be adapted for serial-type or parallel-type PA layer configurations. An example of a serial-type PA layer configurations is a multiple-lane M-PHY module, whereas examples of a parallel interface include DDR-input/outputs (I/Os) and generic wide-I/O using TSVs.

The various embodiments described above are provided by way of illustration only and should not be construed to limit the claims attached hereto. Those skilled in the art will readily recognize various modifications and changes that could be made without following the example embodiments and applications illustrated and described herein, and without departing from the true spirit and scope of the following claims.

What is claimed is:

1. A processing device, comprising
an initiating processor that is arranged in a first substrate and is arranged to initiate a first communication that includes a target processor identifier that identifies a target resource being requested of a target processor;
a first inter-device interface arranged in the first substrate to provide a point-to-point connection with a corresponding inter-device interface that is arranged in a second substrate;
a second inter-device interface arranged in the first substrate to provide a point-to-point connection with a corresponding inter-device interface that is arranged in a third substrate; and
an intra-device switch is arranged in the first substrate to receive the first communication, to determine from the target processor identifier of the received first communication whether the target resource is arranged in the first substrate, to forward the received first communication to the target resource when the target resource is arranged in the first substrate, and to forward the received first communication to a selected inter-device interface of the first and second inter-device interfaces, wherein the selected interface is selected in response to routing information that is received from a routing map in response to the target resource identifier of the received first communication.

2. The device of claim 1, wherein the substrate is one of a silicon substrate having semiconductor junctions formed therein, a stack of semiconductor dies, and a printed circuit board.

3. The device of claim 1, wherein each processor of the target and initiator processors has a unique identifier and addressable resources, and wherein a processor is arranged to initiate a request for addressable resources of a selected processor, and wherein the selected processor is arranged to generate a response to the request for addressable resources of the selected processor.

4. The device of claim 1, wherein the first communication includes an initiating resource identifier for the initiating resource.

5. The device of claim 1, wherein the routing map is arranged in the first substrate and includes resource identifiers for resources that arranged in a second or third substrate.

6. The device of claim 5, wherein the routing map selects the selected interface in accordance with an address range that includes an address that is logically associated with the initiating resource identifier.

7. The device of claim 1, wherein the resource being requested of the target processor is addressed by an address that is in a range of addresses of the processing device, wherein the range of addresses of the processing device is a sub-range of a common address range shared by a network of the processing devices.

8. The device of claim 1, wherein the resource being requested of the target processor is selected by an signal that selected from a group of signals associated with the processing device, wherein the group of signals of the processing device is selected from a common pool of signals that are arranged to selected processing resources across the first inter-device interface of the processing devices.

9. The device of claim 1, wherein the first and second inter-device interfaces are low-latency interfaces that use a stack-based transaction protocol.

10. The device of claim 1, comprising a software driver, that when executed upon a processor, exposes functionality of the first and second inter-device interfaces.

11. The device of claim 1, wherein second communication is generated by the target processor in response the first communication generated by the initiating processor.

12. A networked system, comprising:
a first processing device that is arranged in a first substrate, wherein the first processing device includes an initiating processor, a first and a second inter-device interface each of which is arranged to provide a point-to-point connection with a corresponding inter-device interface, and a first intra-device switch that is arranged to receive from the initiating processor a request communication that includes a target processor identifier that identifies a target resource being requested of a target processor, that is arranged to determine from the target processor identifier of the received request communication whether the target resource is arranged in a processing device other than the first processing device, and that is arranged to forward the received request communication to a selected inter-device interface of the first and second inter-device interfaces when the target resource is arranged in a processing device other than the first processing device;

a first physical medium that is coupled between the first inter-device interface and a third inter-device interface that is arranged to provide a point-to-point connection with the first inter-device interface; and a second processing device that is arranged in a second substrate, wherein the second processing device includes a second processing device processor, the third inter-device interface, and a second intra-device switch that is arranged to receive the forwarded request communication from the third inter-device interface, to determine from the target processor identifier of the forwarded request communication whether a target resource of the second processing device processor is identified by the target processor identifier, and to forward the forwarded request communication to the second processing device processor when a target resource of the second processing device processor is identified by the target processor identifier.

13. The system of claim 12, wherein the first substrate is the substrate of a first die and the second substrate is the substrate of a second die.

14. The system of claim 12, wherein the selected interface is selected in response to routing information that is received from a routing map in response to the target resource identifier of the received request communication.

15. The system of claim 12, wherein the second processing device is arranged to generate a response communication to the forwarded request communication wherein the response communication includes an initiator processor identifier, to send the response communication to the second intra-device switch, to determine from the initiator processor identifier whether the initiator processor is arranged in the first processing device, and to forward the response communication to the third inter-device interface in response to the determination the initiator processor is arranged in the first processing device, and wherein the first processing device is arranged to receive the forwarded response communication, and to send the forwarded response communication to the first intra-device switch.

16. The system of claim 15, comprising a second physical medium that is coupled between the second inter-device interface and a fourth inter-device interface that is arranged to provide a point-to-point connection with the second inter-device interface; and a third processing device that is arranged in a third substrate, wherein the third processing device includes a third processing device processor, the fourth inter-device interface, and a third intra-device switch that is arranged to receive a forwarded request communication from the fourth inter-device interface, that is arranged to determine from the target processor identifier of the forwarded request communication whether a target resource of the third processing device processor is identified by the target processor identifier, and that is arranged to forward the forwarded request communication to the third processing device processor when a target resource of the third processing device processor is identified by the target processor identifier.

17. A method for routing communications across a network of devices, comprising:

receiving from an initiating processor arranged in a first processing device a request communication that includes a target processor identifier that identifies a target resource being requested of a target processor;

determining from the target processor identifier of the received request communication whether the target resource is arranged in a processing device other than the first processing device;

forwarding the received request communication to a selected inter-device interface when the target resource is arranged in a processing device other than the first processing device;

physically coupling the selected inter-device interface to a corresponding inter-device interface of a second processing device to route the forwarded request communication across a point-to-point connection established between the selected inter-device interface and the corresponding inter-device interface;

receiving the routed request communication across the point-to-point connection;

determining from the target processor identifier of the routed request communication whether a target resource of a second processing device processor is identified by the target processor identifier; and forwarding the routed request communication to the second processing device processor when a target resource of the second processing device processor is identified by the target processor identifier.

18. The method of claim 17, comprising selecting the selected interface in response to routing information that is received from a routing map in response to the target resource identifier of the received request communication.

19. The method of claim 17, comprising exposing functionality of the selected inter-device interface and the corresponding inter-device interface to respective operating systems.

20. The method of claim 17, comprising providing a first substrate for the selected inter-device interface and a second substrate for the corresponding inter-device interface.

* * * * *